United States Patent
Jerbi et al.

(10) Patent No.: US 7,010,292 B2
(45) Date of Patent: Mar. 7, 2006

(54) METHOD FOR PROVIDING COMMUNICATION INFORMATION OF A COMMUNICATION UNIT, AND ASSOCIATED DEVICES

(75) Inventors: Belhassen Jerbi, Kirchheim (DE); Josef Laumen, Hildesheim (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 10/491,157

(22) PCT Filed: Sep. 25, 2002

(86) PCT No.: PCT/DE02/03632

§ 371 (c)(1),
(2), (4) Date: Mar. 29, 2004

(87) PCT Pub. No.: WO03/030450

PCT Pub. Date: Apr. 10, 2003

(65) Prior Publication Data
US 2004/0249910 A1  Dec. 9, 2004

(30) Foreign Application Priority Data
Sep. 27, 2001  (DE) ................................ 101 47 770

(51) Int. Cl.
*H04M 3/42*  (2006.01)

(52) U.S. Cl. ............... 455/414.1; 455/517; 379/211.01; 709/238

(58) Field of Classification Search ............... 455/450, 455/414, 433, 517; 379/211.01; 709/238
See application file for complete search history.

(56) References Cited

U.S. PATENT DOCUMENTS

| 5,515,375 | A | 5/1996 | DeClerck |
| 5,742,905 | A | 4/1998 | Pepe et al. |
| 2003/0005150 | A1* | 1/2003 | Thompson et al. ......... 709/238 |
| 2003/0032409 | A1* | 2/2003 | Hutcheson et al. ......... 455/414 |
| 2003/0207685 | A1* | 11/2003 | Rankin ...................... 455/433 |
| 2004/0151294 | A1* | 8/2004 | Baniak et al. ......... 379/211.01 |

* cited by examiner

*Primary Examiner*—Lester G. Kincaid
*Assistant Examiner*—Phuoc Doan
(74) *Attorney, Agent, or Firm*—Bell, Boyd & Lloyd LLC

(57) ABSTRACT

A method and associated devices are provided whereby communication information of a first communication unit is provided via a communication system assigned to the unit. The communication information contains indications on communication possibilities which permit a communication connection with the first communication unit to be set up. Advantageously, a number of communication devices, assigned to the first communication unit, are represented in the indications on communication possibilities. The communication information can be compiled into profiles by the user, which is assigned to the first communication unit, in order to make available only certain information about communication possibilities.

28 Claims, 4 Drawing Sheets

METHOD FOR PROVIDING COMMUNICATION INFORMATION OF A COMMUNICATION UNIT, AND ASSOCIATED DEVICES

BACKGROUND OF THE INVENTION

The present invention relates to a method for providing communication information regarding a communication unit of a user via a communication system assigned to the unit. Therefore, a communication unit refers to the entirety of the communication devices available to a user, such as a mobile telephone, a fixed network telephone, a portable computer or a stationary computer. The present invention also concerns a communication system and a communication device for carrying out the above-described method.

Conventional applications, particularly according to the GSM (Global System for Mobile communication) standard, are implemented without knowledge of the state of the communication partner. A call is effected, a short message or SM within the framework of the SMS (short message service) or a multimedia message of the MMS (multimedia message service) is sent without the initiator (calling subscriber or SMS/MMS sender) having knowledge about the status of the receiver (called subscriber or SMS/MMS addressee); i.e., particularly irrespective of whether or not the user terminal of the receiver is actually switched on. It is, therefore, disadvantageous that the initiator cannot be certain whether or not the receiver, for example, actually receives an urgent message.

In Japan, within the framework of i-mode, a service is used in the cellular phone network environment with the designation "e-mail", but which has nothing to do with the Internet e-mail. This service is used in the same way as chat or instant messaging (instant messaging referring to the immediate exchange of text messages via instant messaging and presence services that is undertaken on the basis of presence information) see RFC 2778 "A Model for Presence and Instant Messaging", M. Day, J. Rosenberg, H. Sugano, February 2000 (http://www.ietf.org/rfc/rfc2778.txt?number=2778) and RFC 2779 "Instant Messaging/Presence Protocol Requirements", M. Day, S. Aggarwal, G. Mohr, J. Vincent, February 2000 (http://www.ietf.org/rfc/rfc2779.txt?number=2779)|. This is a presence-oriented communication services that allows the user to exchange messages and presence notifications under a completely individual standard. Therefore, the communication partners selected by a user are listed on the display of the user mobile telephone with its corresponding status. The user can experience the current status for each selected subscriber; for example, whether or not the i-mode user can be reached via his/her mobile telephone. Icons that show emotion (happy, busy, etc.) are also exchanged between users.

Disadvantageous for such a communication service is the fact that, in the case of the user receiving the information that his/her selected subscriber is not available via his/her mobile telephone at present, it is impossible to reach the selected subscriber via an alternative communication medium or other communication service; for example, in order to send him/her an urgent message.

Therefore, an object of the present invention is to provide a method and device by which the accessibility of a selected subscriber is improved.

SUMMARY OF THE INVENTION

Accordingly, the present invention relates to a method whereby communication information of a first communication unit is provided by a communication system assigned to the unit, in which case the communication information contains indications on communication routes or communication possibilities via which a communication connection to the first communication unit can be set up. Because the communication information includes indications on all or specific communication possibilities via which it is possible to communicate with the first communication unit, it is possible that a further user that identifies, on the basis of the communication information, that a specific communication option is not available, can select a specific alternative communication option. Therefore, unlike the state of the art for which information only can be obtained from the communication system to determine whether or not a specific subscriber or user can be accessed telephonically, the further communication possibilities available to set up a communication connection with a selected subscriber or user also can be shown to, for example, send an urgent message to this subscriber.

The conceptual separation between the communication device and the communication service will be explained using the following example. A "telephone" is a communication device, "telephony," on the other hand, is a communication medium or other communication service.

Telephony only can be carried out with a classical fixed network telephone, or a communication device "mobile telephone" which already supports at least two communication services: "telephony" and "SMS."

The above-mentioned term "communication unit" refers to the entirety of the communication devices available for a user; i.e., a minimum of only one communication device. The term "communication device" REFERS TO all the subscriber terminals or user terminals by means of which a user can set up a communication connection for a further communication device of a further communication unit via a communication service. The communication devices can be a mobile telephone, a fixed network telephone, a fax machine, a portable computer, a stationary computer, a pager, etc. Advantageously, a number of communication devices assigned to the first communication unit are shown in the indications on communication possibilities, it is possible that a user who would like to make contact with the first communication unit can adapt the communication to specific communication devices that advantageously include different types. If, for example, a user determines that a communication device is assigned to the first communication unit that is embodied for sending or receiving multimedia messages, the user can send a multimedia message to the first communication unit if this is seen to be the most suitable.

According to one embodiment of the present invention, one or more communication services are assigned to each one of the (first) communication devices that are shown in the information on communication options. The entirety of the communication devices together with the specifically assigned communication services then yields the communication possibilities of a communication unit. Communication services or communication medium refers to all services via which the communication devices can intercommunicate such as telephony, fax, e-mail, SMS, MMS, instant messaging, etc. In order for these communication services to be addressed unambiguously, a communication address is assigned to each one of these communication services that likewise is shown in the indications on communication possibilities. Advantageously, accessibility information is assigned to each one of the communication services that indicates whether or not a communication connection can be set up at the current moment via the specific communication services with the (first) communication unit in which case the accessibility information is shown in the information of the communication options. The accessibility information may, for example, contain values such as "accessible" ("online"), "not accessible" ("offline"), etc. FA display attribute also can be assigned to the accessibility information that indicates whether or not, and in which way, the display of the accessibility information or the assigned communication services and/or the assigned communication device should be carried out if the communication information should be shown on a display of a communication device of a further user (highlighted in color, identified by underlining, identified by italics, etc.).

According to another embodiment of the present invention, preference information is assigned to one or more (first) communication services that indicate through which communication services a communication connection to the (first) communication unit must be set up in a preferred way, in which case the preference information again is shown in the information of the communication options. Therefore, the (first) user of the first communication unit no longer can indicate only the possible communication options via which he/she can be accessed, but also the possible communications options via which communication services and/or communications address can be determined, i.e., therefore, also via which communication device, a communication connection preferably can be set up by a further user. For example, the first user could prefer to contact him/her during the day at the office via the communication services "telephony" via the "fixed network telephone" and via "instant messaging" via the "stationary computer" because he/she works at his desk at the office the entire day. On the other hand, during free time he/she might prefer to be called by another user via the communication services, "telephony" via his/her private "mobile telephone."

According to a further embodiment, the communication information of the first communication unit also may have user information with respect to the user assigned to the first communication unit. This user information can, for example, give indications on the physical or emotional status (happy, stressed, sick, etc.) of the user. The user information can, for example, be shown as text and/or a corresponding pictogram.

According to yet another embodiment of the present invention, a selection of specific (first) communication devices and/or a selection of specific (first) communication services and/or the user information can be compiled into a presence profile that is released for requesting a further communication unit. As such, a subset or a specific combination of the possibly available communication information of the (first) communication unit is logged by the first user in the presence profile. Therefore, in order to release specific communication information for "making available" or requesting a further communication unit, the user of the first communication unit must only activate a specific presence profile and need not first compile specific communication information manually.

The advantages obtained when defining a presence profile will now be explained in another way. While a user who would like to contact a further user only obtains the information via a conventional presence service whether or not the further user "can be accessed" or "cannot be accessed" via the subscriber terminal, the user in this way according to the present invention obtains further information or communication information that indicates which further communication devices or communication services are available to the further user. Therefore, according to the present invention, dynamic information that, for example, concerns the accessibility of a user is combined with static information that concerns the user for the available communication devices. Should only one user be considered to whom a number of communication devices or subscriber terminals are available, such as a first fixed network telephone, a first stationary computer, a first fax machine and a first mobile telephone at the office as well as a second fixed network telephone, a second stationary computer and a second mobile telephone at home or in during free time, at least the communication devices connected to the telephone network, such as fixed network telephones or the fax machine, normally always obtain the attribute "accessible" or "online". As can be seen, the dynamic information with respect to the accessibility is insufficient together with the static information of the available communication devices in order to indicate the "actual" accessibility of a user. The "actual" accessibility is, rather, linked to the "quasi-static" conditions such as the time of day, the location of the user or during the day the user most likely will, for example, be at the office where, as already has been mentioned above, the first fixed network telephone, the first stationary computer, the first fax machine or the first mobile telephone are made available to him/her, while he/she is most probably at home at night or over weekends where he can then be accessed via the second fixed network telephone, the second stationary computer or the second mobile telephone. Therefore, in order to take these "quasi-static" conditions into consideration, the user of a communication unit can compile specific communication devices or specific communication services into presence profiles that ensure or improve the accessibility of the user at specific locations or at specific times. Therefore, a presence profile may, for example, be defined that particularly indicates the accessibility of a user during the day or at the office, or a presence profile can be defined that indicates the accessibility of the user at night or during the free time. As already has been mentioned, only a corresponding presence profile must be activated to provide the location-specific or the time-of-day-specific information and again be deactivated later.

According to yet a further embodiment of the present invention, the communication information provided by the first communication unit can be requested, sent and/or processed by a second communication unit of a second user via the communication system. In general, the method according to the present invention may, in particular, be integrated in a method for setting up a communication connection. After the first user has provided the communication information of communication possibilities available in the communication system assigned to him/her, a second user can request and analyze this communication information. Subsequently, the second user can select which communication option that is available to the first user he/she would like to use in order to set up a communication connection. A communication connection then can be implemented while, for example, a telephone connection is established from the second to the first user or while general data or messages of any type are sent between either users or their assigned communication units. The messages can be available as text, voice, audio message, picture message, video message, short message (according to the SMS), multimedia message(according to the MMS), etc.

In order for the user of the second communication unit to only obtain communication information from the first communication unit or further communication units that are adapted to the communication devices or communication services made available to him/her, it is advantageous if the user of the second communication unit defines a watcher profile in which a selection of specific communication devices and/or communication services and/or user information is given via which the indications on the communication information of the first or further communication units should be sent to the second communication unit. As such, the user of the second communication unit can compile a subset or a specific combination of selected communication information into the watcher profile via which he/she would like to be informed/notified. Particularly if the user of the first communication unit has a number of possible communication devices and communication services, but the user of the second communication unit only has a limited number of communication devices or communication services, the user of the second communication unit can set his/her watcher profile in such a way that only communication information that corresponds to his/her "capacities" is sent to him/her. If the second communication unit only has a mobile telephone that has telephony and SMS capabilities, the watcher profile assigned to the second communication unit advantageously will only contain indications on such communication devices or communication services.

However, it is also conceivable that a number of watcher profiles are assigned to a communication unit that in the same way as the presence profiles is accordingly adapted to certain "quasi-static" conditions of the user of the specific communication unit. However, it is also possible here that the user of the second communication unit defines a specific watcher profile according to the time of day or the location. If he/she for example, is at the office where he/she has a fax machine, he/she will, in a watcher profile that should be activated during the time of day, indicate use of the fax service as a communication services, in the watcher profile whereas he/she defines a further watcher profile that will not include the fax service at night or during his/her free time where he/she has no fax machine.

However, it is also feasible that the first communication unit to which one or more presence profiles already have been assigned, also has one or more watcher profiles assigned in collaboration with the watcher profiles that are assigned to the second communication unit.

According to one particular embodiment of the present invention, one or more client profiles are assigned to the first communication unit that, in each case, consists of a specific presence profile and a specific watcher profile. This definition of a client profile further increases the user comfort because a user can adapt, in a simple way and at low cost, the data to be provided and requested to the quasi-static conditions such as the time of day or location. Therefore, by defining and using specific profiles such as the presence profile, the watcher profile or the client profile, communication information to be provided or requested can be changed quickly and simply by using limited resources. A command for activating or deactivating a pre-defined profile also can be coded more compactly than would be the case if the entire communication information should be coded. The latter is particularly advantageous for cellular phone network systems and here intensified in the case of roaming where resources are particularly expensive with reference to the air interface. Roaming occurs if a cellular phone network subscriber makes a call in a foreign cellular phone network and/or transfers data; i.e., is in another network than that of the cellular phone network operator assigned to the subscriber.

Once the specific presence profiles and/or watcher profiles and/or client profiles are determined for a communication unit, according to a further embodiment of the present invention, they can be stored in a component of the communication system to which the corresponding communication unit has been assigned. The relevant profiles then can be selected directly, activated or even deactivated again by a user of the corresponding communication unit in order to provide or request specific communication information via the communication system. It is also possible that the profiles are selected by the communication system itself; i.e., automatically according to a specific criterion in which case the criterion can be the time of day, the day of the week or the location of the user assigned to a specific communication unit. The location can be determined while the communication system monitors from which one of these communication devices of a communication unit, a communication connection is or should be set up. For example, if a fixed network telephone at the office of a user makes a telephone call, the communication system can immediately activate all the "office" profiles of the corresponding user or its communication unit even if at the current point in time of the telephone call the day of the week (for example, Saturday or Sunday) or time of day (for example, 23:00) are incorrect to activate the "office" profiles.

According to the communication devices used, the communication system can be a communication network such as a cellular phone network, a telephone network and/or an Internet protocol-based communication network. The cellular phone network as well as the communication devices of communication units that are assigned to the cellular phone network can function according to the GSM, Standard UMTS(Universal Mobile Telecommunication System) standard, etc. According to one advantageous embodiment, the communication system also has an instant messaging and presence service that administers the communication information including the differently defined profiles of the communication units. This service also may monitor the communication connections of communication units in order to set dynamic information such as accessibility information in the case of the communication information of the relevant communication units or to determine the location of a user of a communication unit as mentioned above. Particularly in order to establish the current location of the user by using a mobile telephone, the communication system can localize the mobile telephone of this user by using the positioning services of the mobile radio communications network (e.g., a UMTS network).

According to a further embodiment of the present invention, a communication system is created that is particularly suitable for carrying out the method according to the present invention and has components in which the communication information can be stored, and gives information of the communication options via which a communication connection can be set up with a first communication unit of a first user assigned to a communication system.

Preferably, one or more presence profiles can be stored in the components of the communication system that consist of a selection of communication devices assigned to one of the first communication units and/or a selection of communication services and/or user information about the first user which can be released to be requested by a further communication unit. In addition, one or more watcher profiles can be stored in one of the components of the communication system in which a selection of specific communication devices and/or communication services and/or user information is indicated via which the indications on communication information should be sent to another communication unit of the first communication unit. Preferably, one or more client profiles also are stored in one of the components that in each case consist of a specific presence profile and a specific watcher profile.

According to one embodiment, the communication system has a selection device via which one or more of the above-mentioned profiles that are stored in one of the components can be selected or activated and again deactivated. The selection device can select or activate the profiles if instructed by the first user or automatically depending on the time of day, the day of the week, the location of the first user, etc.

According to yet another embodiment of the present invention, a communication device particularly for carrying out the method according to the present invention is created that has a device for sending the communication information of a communication unit to and/or from one of the communication systems assigned to the communication unit. As such, via the communication device, the communication information of a communication unit can be sent to the communication system and/or the communication information of further communication units can be requested from the communication system and sent from the latter. Advantageously, the communication device also has a device in which the communication information can be processed or indicated and changed. It is also advantageous if the communication device has a device for compiling specific communication information of a communication unit into profiles. If a number of profiles was defined, it is advantageous if the communication device also has a device for selecting or activating one or more of the profiles.

Additional features and advantages of the present invention are described in, and will be apparent from, the following Detailed Description of the Invention and the Figures.

DETAILED DESCRIPTION OF THE INVENTION

Figure 1:
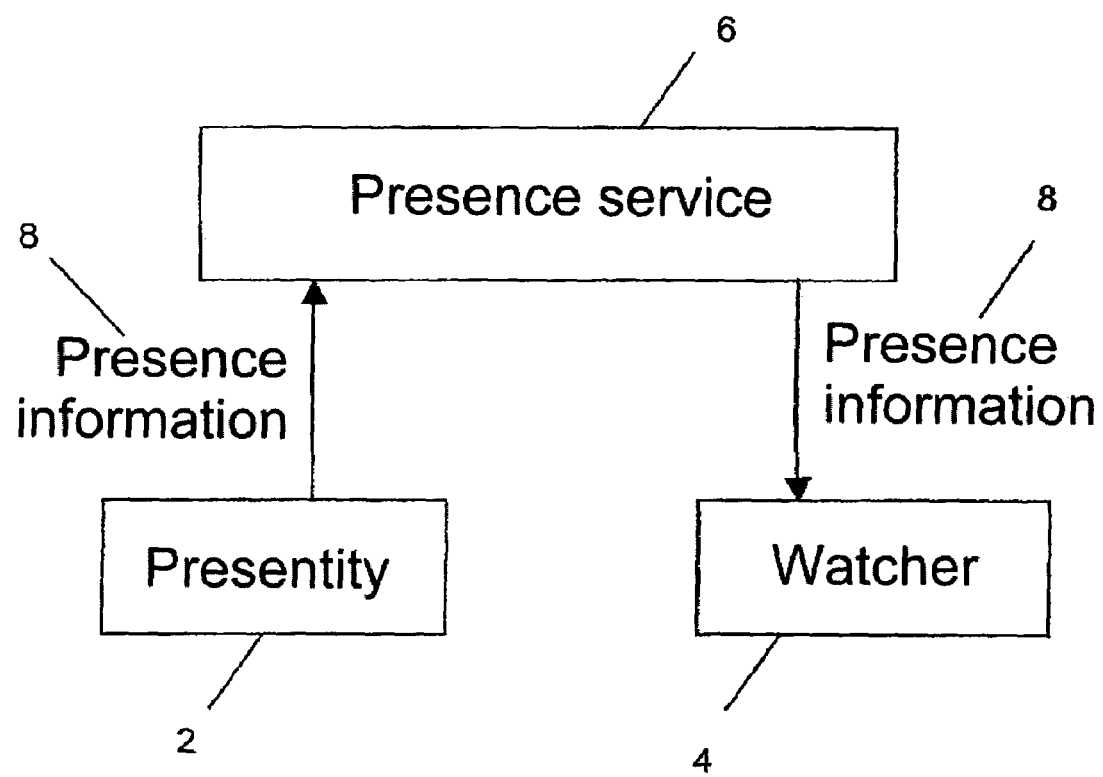
FIG. 1 shows a diagram of the logical units of a presence service.

In the case of a presence system according to a generic framework model of the IETF (Internet Engineering Task Fore) as is shown in FIG. 1, presence information 8 is exchanged between a first unit (the so-called "presentity" 2) and a second unit (the so-called "watcher" 4). The presence information indicates the accessibility pf the presentity regarding a communication device via a communication services assigned to it (for example, mobile telephone via telephony) or icons that show emotion of the presentity. The presentity 2 is a unit that is represented by a subscriber or an application program and provides or makes available presence information 8. The watcher 4 is a unit that is also represented by a subscriber or an application program and serves to receive the presence information 8 of another unit or another subscriber. The presentity 2 provides its presence information 8 via a communication system that has a presence service 6 for sending or administering the presence information. Therefore, the communication system may, include one or more communication networks to allow a communication connection between different communication devices or via different communication services as explained below. The communication networks also can be interconnected via special devices such as "gateways". The watcher 4 (second unit) can access the presence information of the presentity 2 (first unit) in which case access is only possible after overcoming specific safety precautions such as an access control or an authorizing process. On the other hand, the watcher 4 can actively and explicitly ask for and request the presence information of the presentity 2 and, on the other hand, the presence service 6 can notify the watcher 4 when the status of the presence information of the presentity 2 is changed.

Figure 2:
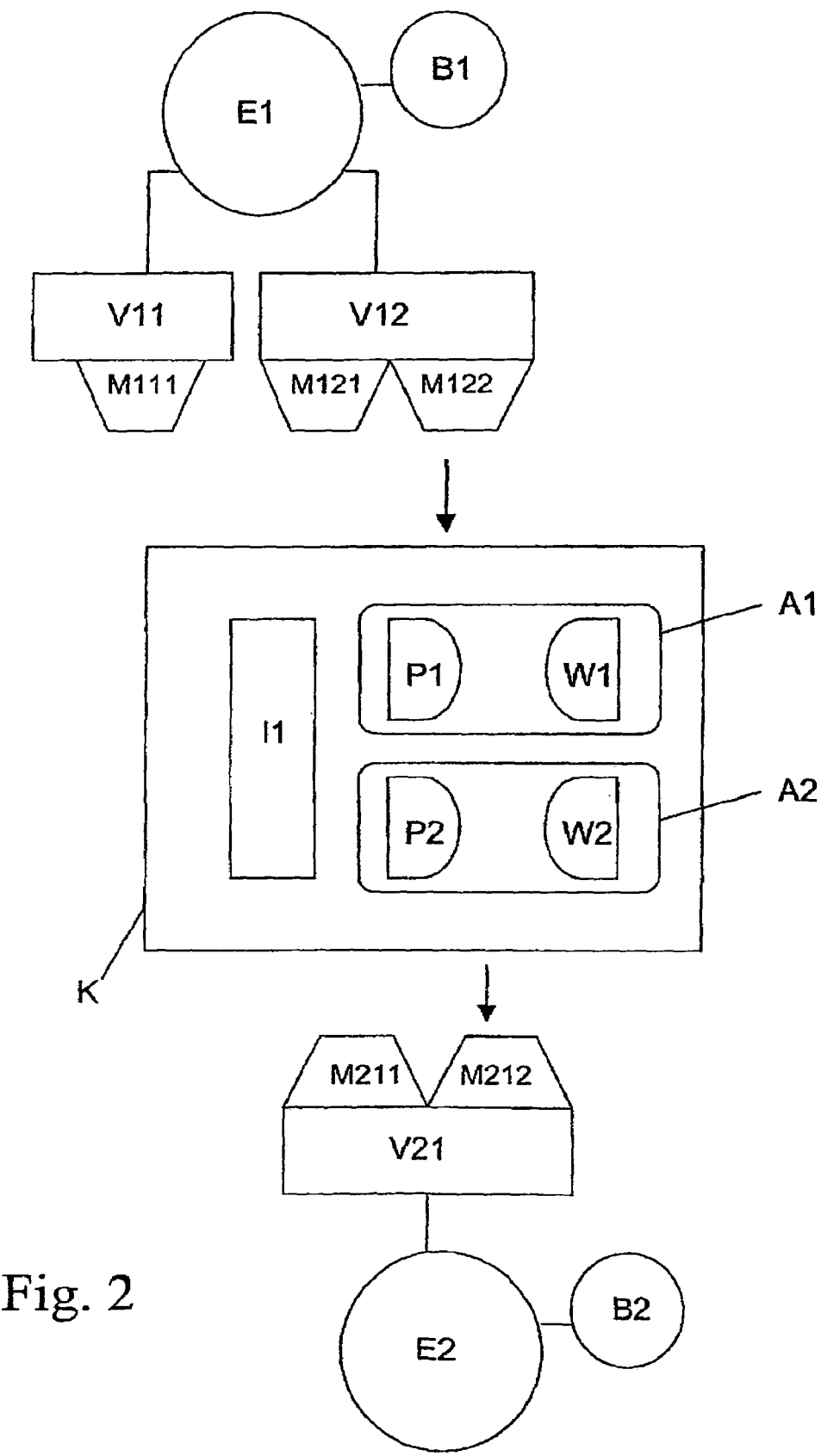
FIG. 2 shows a diagram of a first communication unit that is connected to a second communication unit via a communication system.

This simple presence system will be expanded according to the present invention as shown in FIG. 2.

As can be seen in the top section of FIG. 2, a first communication unit E1 is assigned to a first user B1. The communication unit E1 represents the entirety of the communication devices available to the user B1; in this case, devices V11 and V12. These communication devices can, for example, be a stationary computer, a portable computer, a mobile telephone or a fixed network telephone. Communication services or communication media M111 or M121 and M122 are assigned to the communication devices V11 and V12. These communication services are available for services via which the first communication unit E1 sends information or messages to a communication system K or via the communication system K to a further communication unit or can receive from the communication system K or a further communication unit. These can be telephony, an instant messaging service, an MMS, an SMS, an e-mail service or a fax service. The first user B1 can prepare or combine the information of his/her communication unit E1 and its assigned communication devices V11 and V12 or the corresponding communication services M111 or M121 and M122 and can initiate that this information is stored or logged in one of the components of the communication system. Advantageously, the administration of this information or communication information of the communication unit E1 is taken over by a presence service such as an "instant messaging and presence" service. It is noted that the communication information, besides or in addition to the above-mentioned presence information that indicates the accessibility of a communication unit with respect to a communication device via one of these assigned communication services, rather indicates the entirety or a specific selection of communication devices together with the relevant assigned communication services, and therefore, indicates the available communication possibilities of a communication unit. In order to optimize the accessibility of the first communication unit E1, specific communication information I1 is compiled into so-called presence profiles P1 and P2 in which, for example, depending on the time of day, the day of the week or the location of user B1, those communication services or communication devices are indicated via which the first communication unit E1 and, therefore, the user B1 can preferably or best be accessed. In addition to the presence profiles P1 and P2, so-called watcher profiles W1 and W2 are also stored or logged in the communication system K via which the first user B1 can specify which communication information should be sent to him/her by further communication units. In this case, the watcher profiles W1 and W2 again can be adapted to the time day, the day of the week or the location of the user B1 in order to guarantee that a user only receives the communication information from other communication units that correspond to the (current) capacity. The user B1 also can compile specific presence profiles and watcher profiles into so-called client profiles in which case the presence profile P1 and the watcher profile W1 as shown in FIG. 2 were compiled into a client profile A1 and the presence profile P2 and the watcher profile W2 into a client profile A2. On the one hand, by defining these profiles, the user B1 simply can select or activate communication information I1 for releasing (presence profiles) to other communication units or for receiving (watcher profiles) communication information I1 from further communication units in a simple way and later deactivate them. By using client profiles, this comfort is increased further. Particularly in the case of cellular phone network systems, this selection possibility of specific communication information about pre-defined profiles is advantageous because an activation of the profiles only requires few resources.

Communication information of the first communication unit E1 provided via the communication system then can be requested, sent or processed by a second communication unit E2 of a second user B2.

However, the second user B2 must first of all make contact with the communication system K or the components thereof to be administered by the communication information in order to signal that he/she would like to receive the communication information from the first user B1 or further users. For example, he/she can do this by correspondingly adapted signaling procedures, a telephone call, by sending a short message via an SMS, by sending an e-mail, etc. to the communication system. Possibly, the second user B2 must first undergo a safety check such as an authorizing process before he/she receives an authorization to access the communication information I1 of the first user B1. Advantageously, the second communication unit E2 also would have defined one or more watcher profiles (not shown) via which only specific communication information of the first communication unit E1 is sent. As can be seen in the diagram, a communication device—V21, to which the communication services M211 and M212 are made—available, is assigned to the second communication unit E2 and via which information or messages are sent to the communication system K or can be received from the first communication unit E1. It is noted that the second communication unit E2 or the second user B2 can log or store corresponding profiles such as the first communication unit E1 in the communication system K.

Figure 3:
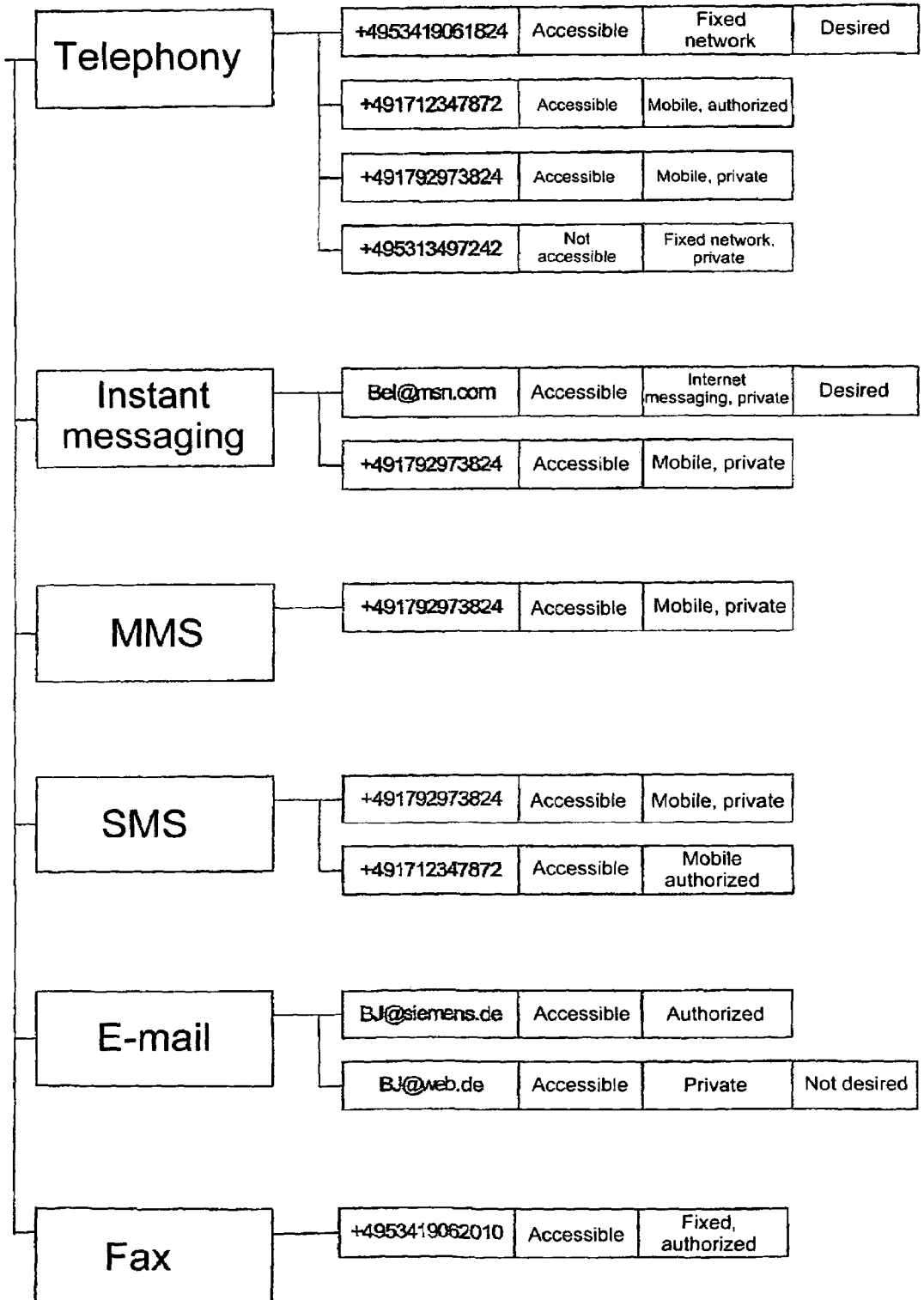
FIG. 3 shows a diagram of the communication information of a communication unit assigned to a user that is compiled into an "office" profile.

According to the diagram of the presence system that is used according to the present invention, embodiments to show or provide the communication information on the basis of FIGS. 3 and 4 will be explained.

As already has been mentioned in FIG. 2, the communication information of a communication unit is advantageously stored in a communication system. In the communication system that can have one or more communication networks, an "instant messaging and presence" service is provided from which the communication information is administered. In an exemplary view of the communication information of a communication unit that is allocated to a user, the specific communication information is arranged in a folder structure and sorted according to the communication structures such as "telephony", "instant messaging", "MMS", "SMS", "e-mail" and "Fax". The relevant communication addresses are indicated in the right column next to the communication services via which, depending on a specific communication device, a communication connection can be set up. In this way, for example, both the communication services "telephony" and the different telephone numbers (in the case of telephony via mobile telephones particularly as MSISDN numbers (Mobile Services ISDN numbers; ISDN: Integrated Services Digital Network) are given as communication addresses. Accessibility information about each communication services is found in the right column next to the communication addresses indicating whether the communication unit "can be accessed" or "cannot be accessed" via the specific communication services.

In the right column next to the accessibility information, the type of communication connection or the designation of the communication device is indicated via which a communication service on the left of the display and a communication connection on the left of the communication address can be set up. Via the designations of the communication devices such as "fixed network, authorized", "mobile, authorized", "mobile, private", "fixed network, private" it is possible to determine whether or not it is a fixed network telephone or a mobile telephone for authorized or private purposes. The designation "internet messaging, private" can represent a portable stationary computer that is used for private purposes. The terms "authorized" or "private" can also express that it is a portable or a stationary computer that is used for authorized or private purposes.

In the right column next to the indications of the communication devices, a column for preference information is provided (here, 3 entries) in which is indicated via which communication service or which communication address and, therefore, communication device the user would like to be contacted. In the case shown in FIG. 3, the user to be seen here as presentity would prefer to be contacted via his/her authorized fixed network telephone than via his/her mobile telephones. It is also indicated that the private fixed network connection cannot be accessed. An explicit expression of the affinities concerning specific communication services follows on the basis of preference attributes that explain the affinities of different communication services. The attribute fields can, for example, include the designations "desired", "not desired" or "only in urgent cases". As shown in FIG. 3, the user would like to be contacted either via the "Internet messaging service" or via his/her authorized telephone connection. He/she also would not like to receive e-mails via his/her private e-mail address. Therefore, the user can mention his preferred communication services and list further communication devices or terminals from top to bottom according to the degree of preference. As already has been mentioned above, specific communication information about profiles, in this case presence profiles, can be compiled that, for example, are adapted to the "quasi-static" conditions of the specific user such as the time of day, location, etc. The diagram of the communication information shown in FIG. 3 can then be designated as the presence profile with the title "office" that can be activated during the working hours of the user.

It should be noted that, particularly in the case of mobile communication devices such as mobile telephones, it is advantageous to know the current location or the country or the communication network in which the mobile communication device is registered. This location information can be determined on registering in a communication network or by positioning services and the like and in the case of mobile communication devices can be provided in the communication information of these (for example in the indication of the country of residence "Germany", "Australia", etc.). For instance, if a user identifies on the basis of the communication information of a further user that he/she is abroad where there are high cellular phone network costs, then he/she can decide not to contact the further user via his/her mobile telephone to save costs.

Figure 4:
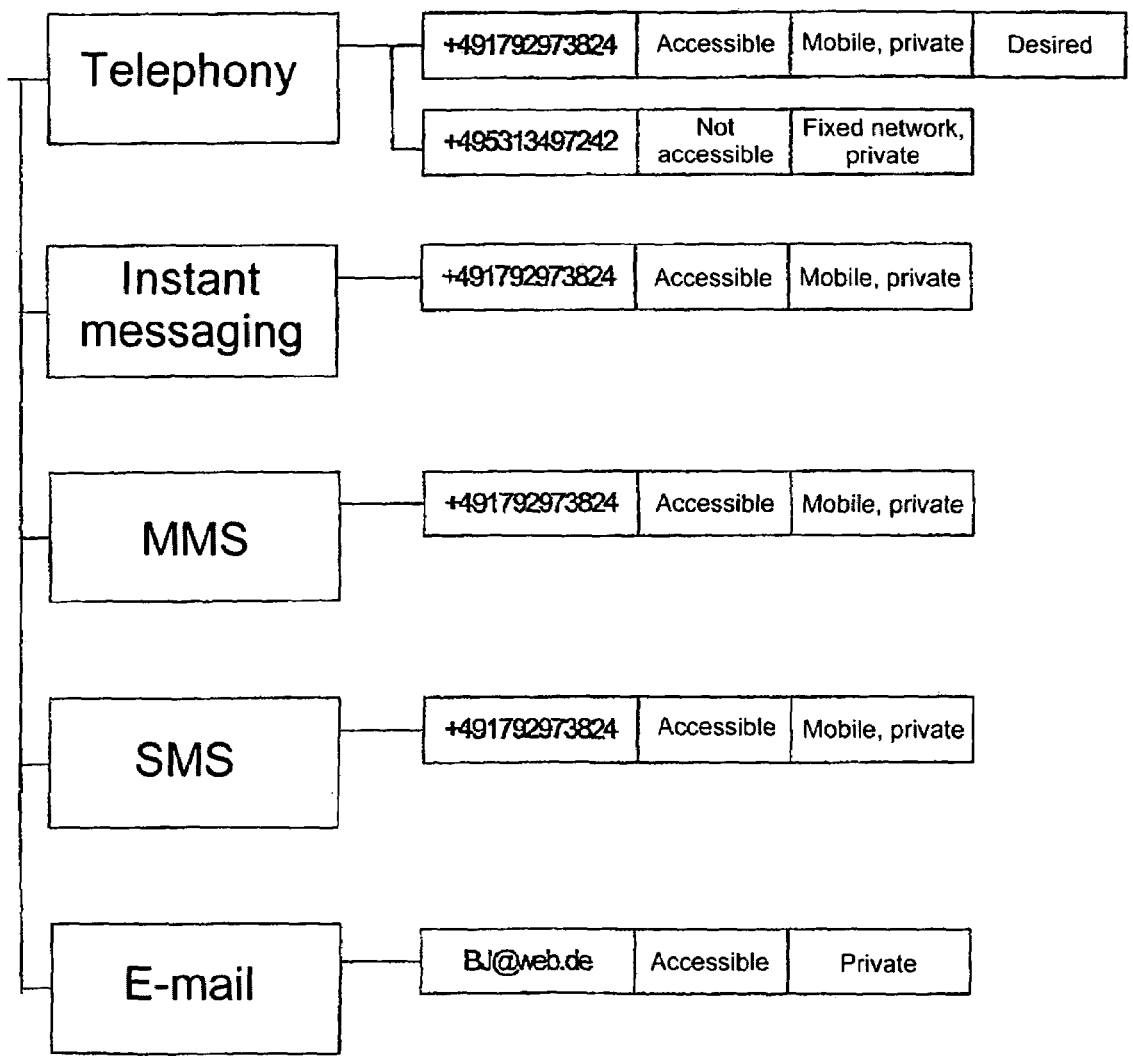
FIG. 4 shows a diagram of the communication information of a communication unit assigned to a user that is compiled into a "free time" profile.

FIG. 4 shows the communication information of a user or a communication unit assigned to the user that represents a presence profile with the tile "free time" because no indications on authorized communication services or communication devices are provided. Because the meaning of the individual columns or rows already have been explained in FIG. 3, it is not necessary to explain FIG. 4 in great detail.

It is possible that the user creates and edits the corresponding communication information in one of his/her communication devices and then makes it available via the communication system. As already has been mentioned, it is advantageous to log the communication information as well as the above- mentioned profiles (presence profile, watcher profile, client profile) on a so-called presence server ("presence server") of a presence service such as the "instant messaging and presence" service that is provided as a component of the communication system. For example, the presence server can be embodied in a cellular phone network as part of an HLR (Home Location Register); i.e., a database-supported processing unit that contains the main data of the subscriber of a PLMN (Public Land Mobile Network) but also as an automatic device in a cellular phone network or another communication network. Particularly if the user has a mobile telephone, it is possible for him/her to send a command to the presence server with low resource costs via the air interface in order to activate a pre-defined profile so that specific communication information can be forwarded to another user (watcher).

As already has been mentioned, a user can, in the case of the presence system according to the present invention, make available all the communication information or only one subset thereof via the communication system. The first variant (to make available all the communication information) allows a further user (watcher) to have an entire overview of the possibilities of the first user (presentity). In such a case, information can also be useful via currently non-accessible communication devices or terminals. For example, the second user can decide to send an e-mail to the private inbox of the first user although the latter has indicated that he/she cannot be accessed via this e-mail address at the moment and will subsequently will not immediately read the e-mail. Accordingly, it is also advantageous if the second user as required and depending on the available resources can request either all the presence information of the first user or, for example, only the information with reference to communication services or communication devices that can be accessed at the moment. A further possibility of the selection of requested communication information (for example, in a watcher profile) can take place with reference to communication services in which case the second user can only request information about such communication services that support his/her communication devices. For example, information regarding MMS could be irrelevant if the second user has no MMS-capable communication device.

If the second user designated as user B2 in FIG. 2 would now like to request the communication information of the first user B1, he/she can send a request command from his/her communication device V21 to the communication system K (particularly to the system in this presence service provided) that then sends all or selected communication information to his/her communication device V21. Advantageously, this communication device has a multi-line display on which the possible communication possibilities for the first communication unit E1 can be clearly shown. It is also feasible that the second communication unit E2 or the second user B2 automatically sends the communication information of the first communication unit E1 if this information has been changed.

Accordingly, the communication devices V11 and V12 are available to the first user B1 in order to create and edit the communication information for the first communication unit I1 and send this information via a corresponding device to the communication system K. In order to clearly show the communication information and to facilitate an editing process, it is advantageous if the corresponding communication device of the user B1 also has a multi-line display. In addition, it is advantageous if a communication device of the first user B1 has a device for compiling the communication information into profiles that already have been explained above. If the first user B1 has created profiles, it is also advantageous if one of the communication devices has a device for selecting or activating the profiles in the communication system.

Although the present invention has been described with reference to specific embodiments, those of skill in the art will recognize that changes may be made thereto without departing from the spirit and scope of the present invention as set forth in the hereafter appended claims.

What is claimed is:

1. A method for providing communication information in a communication system, the method comprising the steps of:

providing communication information of a first communication unit via a communication system assigned to the first communication unit of a first user, the communication information including communication options via which a communication connection to the first communication unit may be set up, with the communication options including communication services and communication devices;

requesting, via a second communication unit of a second user, the communication information of the first communication unit via the communication system;

selecting, by the second user via the second communication unit, a specific communication option from the communication information; and setting up, by the second user via the second communication unit, a communication connection to the first communication unit via the selected communication option.

2. A method for providing communication information in a communication system as claimed in claim 1, wherein a plurality of communication devices assigned to the first communication unit are shown in the communication options.

3. A method for providing communication information in a communication system as claimed in claim 2, wherein at least one communication service assigned to each communication device is shown in the communication options.

4. A method for providing communication information in a communication system as claimed in claim 3, wherein each of the communication services assigned to a communication address is shown in the communication options.

5. A method for providing communication information in a communication system as claimed in claim 3, wherein each of the communication services is assigned to accessibility information indicating whether a communication connection via each respective communication service can be set up to the first communication unit at a current point in time, with the accessibility information being shown in the communication options.

6. A method for providing communication information in a communication system as claimed in claim 3, wherein at least one communication service is assigned to preference information indicating via which communication service or communication connection to the first communication unit must be set up, with the preference information being shown in the communication options.

7. A method for providing communication information in a communication system as claimed in claim 1, wherein the communication information of the first communication unit includes user information with respect to a user assigned to the first communication unit.

8. A method for providing communication information in a communication system as claimed in claim 7, wherein a selection of at least one of communication devices, communication services and the user information is compiled into a presence profile which is released for requesting by a further communication unit.

9. A method for providing communication information in a communication system as claimed in claim 8, wherein a plurality of different presence profiles are assigned to the first communication unit.

10. A method for providing communication information in a communication system as claimed in claim 1, wherein the second communication unit passes through an authorization process before the communication information may be requested.

11. A method for providing communication information in a communication system as claimed in claim 1, wherein the second communication unit is assigned to at least one watcher profile in which a selection of at least one of communication devices, communication services and user information is indicated via which indications on the communication information of one of the first communication unit and a further communication unit should be sent to the second communication unit during the request.

12. A method for providing communication information in a communication system as claimed in claim 8, wherein the first communication unit is assigned to at least one watcher profile in which a selection of at least one of communication devices, communication services and user information is indicated via which indications on communication information of another communication unit to the first communication unit should be sent.

13. A method for providing communication information in a communication system as claimed in claim 12, wherein the first communication unit is assigned to at least one client profile which consists of a specific presence profile and a specific watcher profile.

14. A method for providing communication information in a communication system as claimed in claim 12, wherein at least one of the communication information of the first communication unit, the presence profile, the watcher profiles and the client profiles are stored in the communication system.

15. A method for providing communication information in a communication system as claimed in claim 12, wherein at least one of a specific presence profile, a specific watcher profile and the client profile is selected from a user assigned to the first communication unit to be provided via the communication system.

16. A method for providing communication information in a communication system as claimed in claim 12, wherein at least one of a specific presence profile, a specific watcher profile and the client profile is selected according to specific criteria from the communication system to be provided via the communication system.

17. A method for providing communication information in a communication system as claimed in claim 16, wherein the specific criteria includes one of a time of day, a day of the week and a place of residence of the user assigned to the first communication unit.

18. A method for providing communication information in a communication system as claimed in claim 7, wherein the user information includes at least one of an emotional and a physical state of the user.

19. A method for providing communication information in a communication system as claimed in claim 1, wherein one of the communication devices is one of a mobile telephone, a fixed network telephone, a portable computer, a stationary computer and a pager.

20. A method for providing communication information in a communication system as claimed in claim 1, wherein one of the communication services is one of telephony, an instant messaging service, an MMS, an SMS, e-mail service and a faxed service.

21. A method for providing communication information in a communication system as claimed in claim 1, wherein the communication system includes at least one of a cellular phone network, a telephone network and an internet protocol-based communication network.

22. A method for providing communication information in a communication system as claimed in claim 1, wherein the communication system includes a presence service.

23. A communication system for providing communication information, comprising:
    a first communication unit assigned to a first user to which the communication system is assigned;
    a component for storing communication information of the first communication unit, the communication information including communication options via which a communication connection to the first communication unit may be set up, the communication options including communication services and communication devices; and
    a second communication unit assigned to a second user which may request receipt of the communication information about the first communication unit from the communication options, and which may further select a specific communication option and set up a communication connection via the selected communication option to the first communication unit.

24. A communication system as claimed in claim 23, wherein at least one presence profile may be stored in at least one of one of the communication devices assigned to the first communication unit, one of the communication services assigned to the first communication unit and user information about a user of the first communication unit, with the at least one presence profile serving as the communication information of the first communication unit.

25. A communication system as claimed in claim 23, wherein at least one watcher profile may be stored in at least one of a communication device assigned to the first communication unit, a communication service assigned to the first communication unit and user information about a user of the first communication unit via which indications on the communication information of a further communication unit should be sent to the first communication unit.

26. A communication system as claimed in claim 23, wherein at least one client profile may be stored in at least one of a communication device assigned to the first communication unit, a communication service assigned to the first communication unit and user information about a user of the first communication unit and which respectively include a specific presence profile and a specific watcher profile.

27. A communication system as claimed in claim 24, further comprising a selection device via which at least one profile that is stored in one of a communication device assigned to the first communication unit, a communication service assigned to the first communication unit and user information about a user of the first communication unit may be selected to be provided via the communication system.

28. A communication system as claimed in claim 27, wherein the selection device makes a selection based on one of an instruction from the user of the first communication unit, automatically depending on a time of day, automatically depending on a day of the week and automatically depending on a location of the user.

\* \* \* \* \*